US012654874B2

(12) United States Patent
Wang et al.

(10) Patent No.: US 12,654,874 B2
(45) Date of Patent: Jun. 16, 2026

(54) AIRCRAFT HIGH-LOAD LANDING EVENT DETECTION, CLASSIFICATION AND MAINTENANCE GUIDANCE METHODS

(71) Applicant: CHENGDU CAIC ELECTRONICS CO., LTD, Chengdu (CN)

(72) Inventors: Tianqi Wang, Chengdu (CN); Grant Alexander Gordon, Peoria, AZ (US); Xin Wang, Chengdu (CN); Peng Zhang, Chengdu (CN); Xiangzhi Li, Chengdu (CN)

(73) Assignee: CHENGDU CAIC ELECTRONICS CO., LTD, Chengdu (CN)

( * ) Notice: Subject to any disclaimer, the term of this patent is extended or adjusted under 35 U.S.C. 154(b) by 0 days.

(21) Appl. No.: 18/997,523

(22) PCT Filed: Jun. 25, 2024

(86) PCT No.: PCT/CN2024/101374
§ 371 (c)(1),
(2) Date: Jan. 22, 2025

(87) PCT Pub. No.: WO2025/077291
PCT Pub. Date: Apr. 17, 2025

(65) Prior Publication Data
US 2026/0008562 A1       Jan. 8, 2026

(30) Foreign Application Priority Data

Oct. 8, 2023    (CN) ........................ 202311288942.X

(51) Int. Cl.
*B64D 45/00*          (2006.01)
(52) U.S. Cl.
CPC ........ *B64D 45/00* (2013.01); *B64D 2045/008* (2013.01); *B64D 2045/0085* (2013.01)

(58) Field of Classification Search
CPC .............. B64D 45/00; B64D 2045/008; B64D 2045/0085
(Continued)

(56) References Cited

U.S. PATENT DOCUMENTS 8,180,504 B1     5/2012  Nance
8,903,572 B1    12/2014  Hagelin et al.
(Continued)

FOREIGN PATENT DOCUMENTS

CA          2610835 A1   12/2006
CN      101109640 A      1/2008
(Continued)

OTHER PUBLICATIONS

Chao Tonga, et al., An Innovative Deep Architecture for Aircraft Hard Landing Prediction Based on Time-Series Sensor Data, Journal of Latex Templates, 2018, pp. 1-20.
(Continued)

*Primary Examiner* — Shardul D Patel
(74) *Attorney, Agent, or Firm* — Bayramoglu Law Offices LLC

(57)                ABSTRACT

Aircraft high-load landing event detection, classification and maintenance guidance methods relate to the technical field of aircraft high-load landing event detection. The aircraft high-load landing event detection method collects complete and accurate landing data online during an aircraft landing process and performs an analysis and calculation to determine whether a high-load landing event occurred and determines the type of the high-load landing event. The aircraft high-load landing event detection method removes the high-load landing event determination from the pilot's subjective perception and does not need to wait for decoding of quick access recorder (QAR) data, greatly improving the accuracy and timeliness of high-load landing event detection. In
(Continued)

addition, by analyzing and estimating structural loads of the aircraft, the aircraft high-load landing event detection method provides targeted maintenance recommendations for possible aircraft structural damage caused by the high-load landing event, and forms a corresponding report.

29 Claims, 4 Drawing Sheets

(58) Field of Classification Search
USPC .............................................................. 701/3
See application file for complete search history.

(56) References Cited

U.S. PATENT DOCUMENTS

| | | | |
|---|---|---|---|
| 2007/0008187 A1 | 1/2007 | Schmidt | |
| 2008/0114506 A1* | 5/2008 | Davis | G05B 13/0265 |
| | | | 701/16 |
| 2010/0114411 A1* | 5/2010 | Schmidt | B64C 25/001 |
| | | | 340/960 |
| 2011/0046825 A1 | 2/2011 | Lastere et al. | |
| 2011/0231037 A1 | 9/2011 | Stiharu et al. | |
| 2013/0030614 A1* | 1/2013 | Ding | G07C 5/085 |
| | | | 701/16 |

FOREIGN PATENT DOCUMENTS

| | | | |
|---|---|---|---|
| CN | 102901531 A | 1/2013 |
| CN | 103476677 A | 12/2013 |
| CN | 105235911 A | 1/2016 |
| CN | 107273561 A | 10/2017 |
| CN | 110261017 A | 9/2019 |
| CN | 110844055 A | 2/2020 |
| CN | 111152916 A | 5/2020 |
| CN | 113919597 A | 1/2022 |
| CN | 115465468 A | 12/2022 |
| CN | 116353839 A | 6/2023 |
| CN | 117033949 A | 11/2023 |

OTHER PUBLICATIONS

Zhang Yubai, et al., The Effect that Different Mounted Positions of Acceleration Sensors Made to Flying Qualities for a Fly-by-wire Aircraft, AVIC, 2014, pp. 49-55, No. 3.

Ying Chen-Wei, Research on Fault Diagnosis Method of Aircraft Rigid Land Based on AdaBoostSVM Algorithm, Civil Aviation University of China, 2017, pp. 1-72.

* cited by examiner

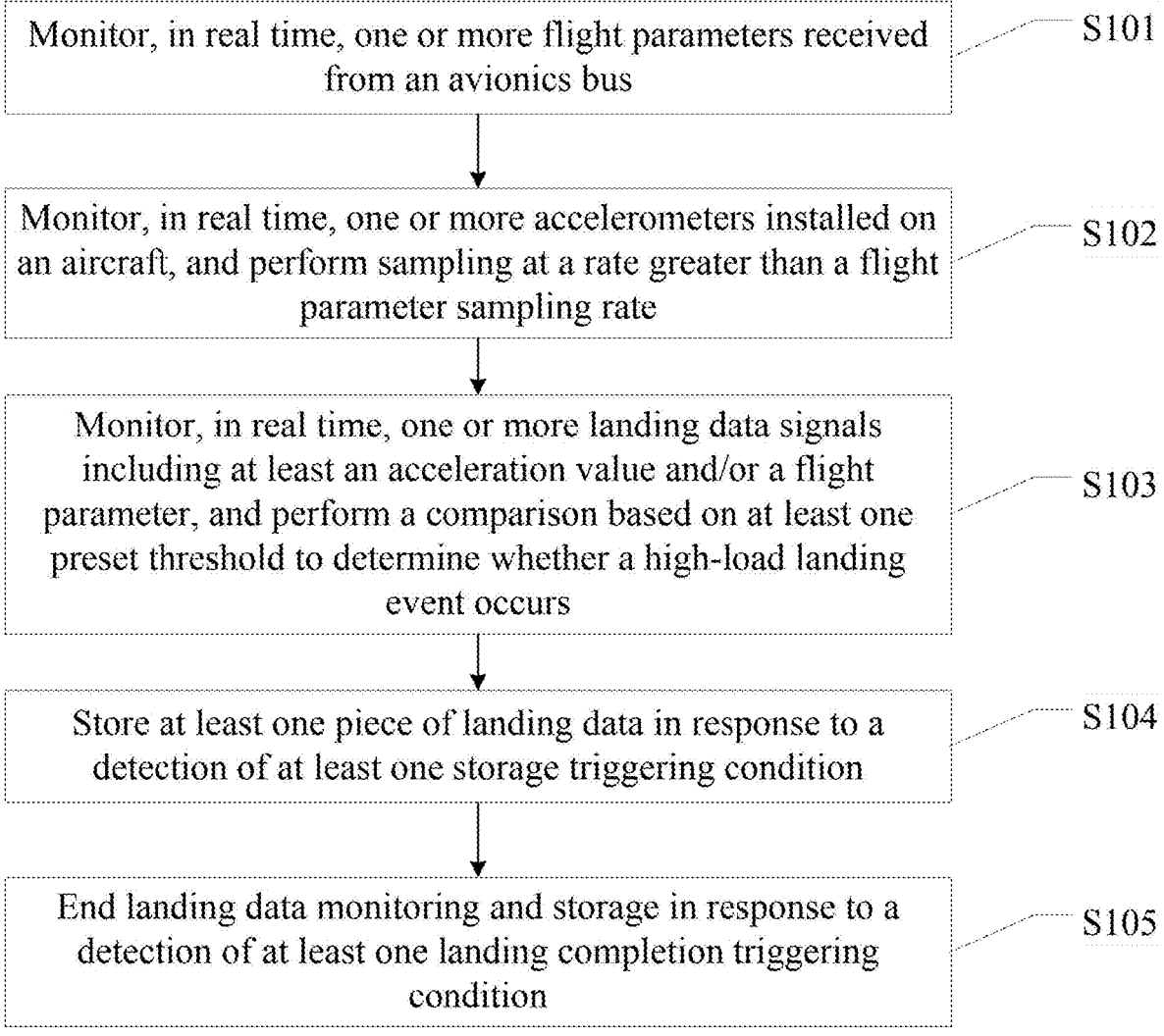

Monitor, in real time, one or more flight parameters received from an avionics bus — S101

Monitor, in real time, one or more accelerometers installed on an aircraft, and perform sampling at a rate greater than a flight parameter sampling rate — S102

Monitor, in real time, one or more landing data signals including at least an acceleration value and/or a flight parameter, and perform a comparison based on at least one preset threshold to determine whether a high-load landing event occurs — S103

Store at least one piece of landing data in response to a detection of at least one storage triggering condition — S104

End landing data monitoring and storage in response to a detection of at least one landing completion triggering condition — S105

FIG. 1

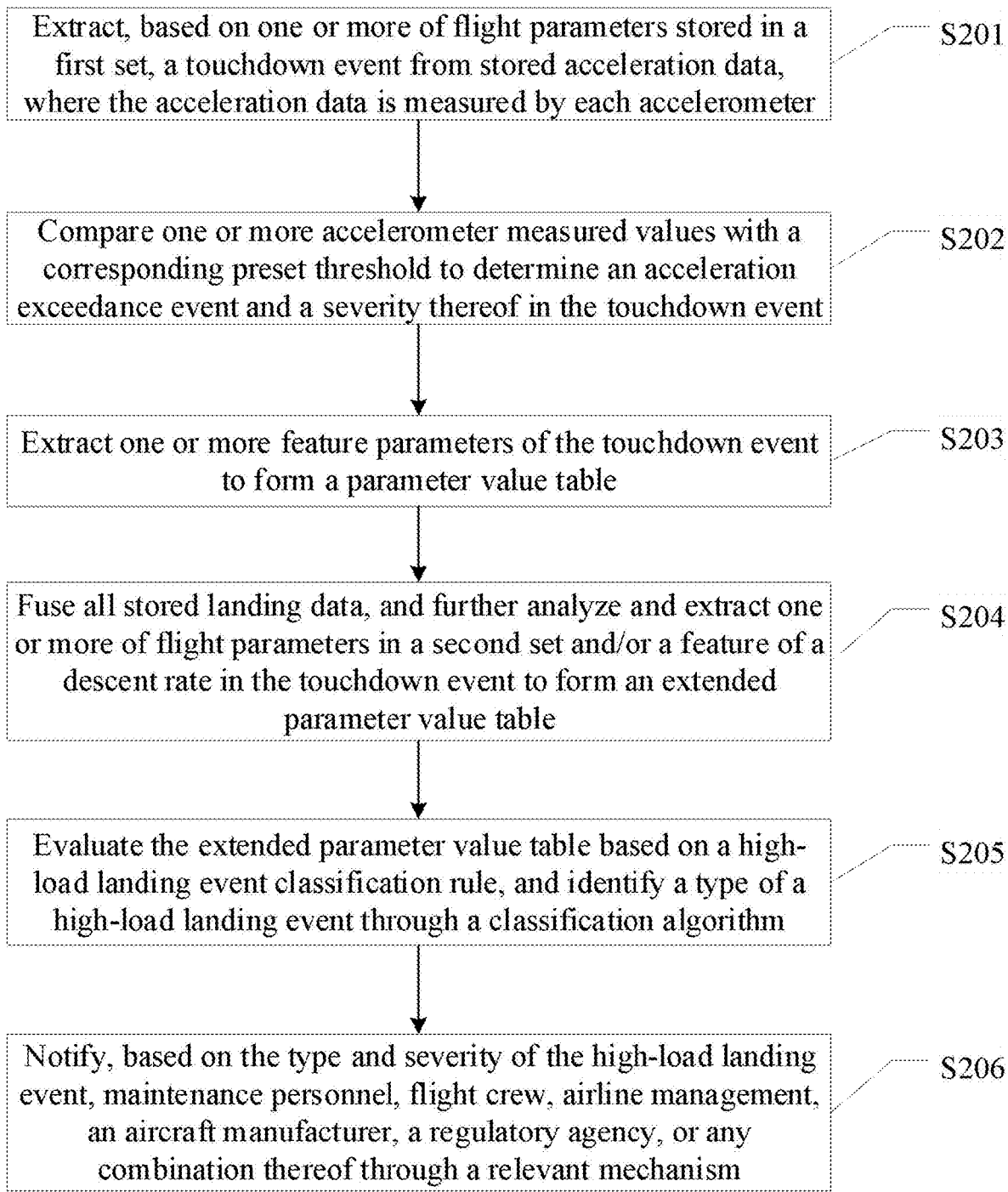

Extract, based on one or more of flight parameters stored in a first set, a touchdown event from stored acceleration data, where the acceleration data is measured by each accelerometer — S201

Compare one or more accelerometer measured values with a corresponding preset threshold to determine an acceleration exceedance event and a severity thereof in the touchdown event — S202

Extract one or more feature parameters of the touchdown event to form a parameter value table — S203

Fuse all stored landing data, and further analyze and extract one or more of flight parameters in a second set and/or a feature of a descent rate in the touchdown event to form an extended parameter value table — S204

Evaluate the extended parameter value table based on a high-load landing event classification rule, and identify a type of a high-load landing event through a classification algorithm — S205

Notify, based on the type and severity of the high-load landing event, maintenance personnel, flight crew, airline management, an aircraft manufacturer, a regulatory agency, or any combination thereof through a relevant mechanism — S206

FIG. 2

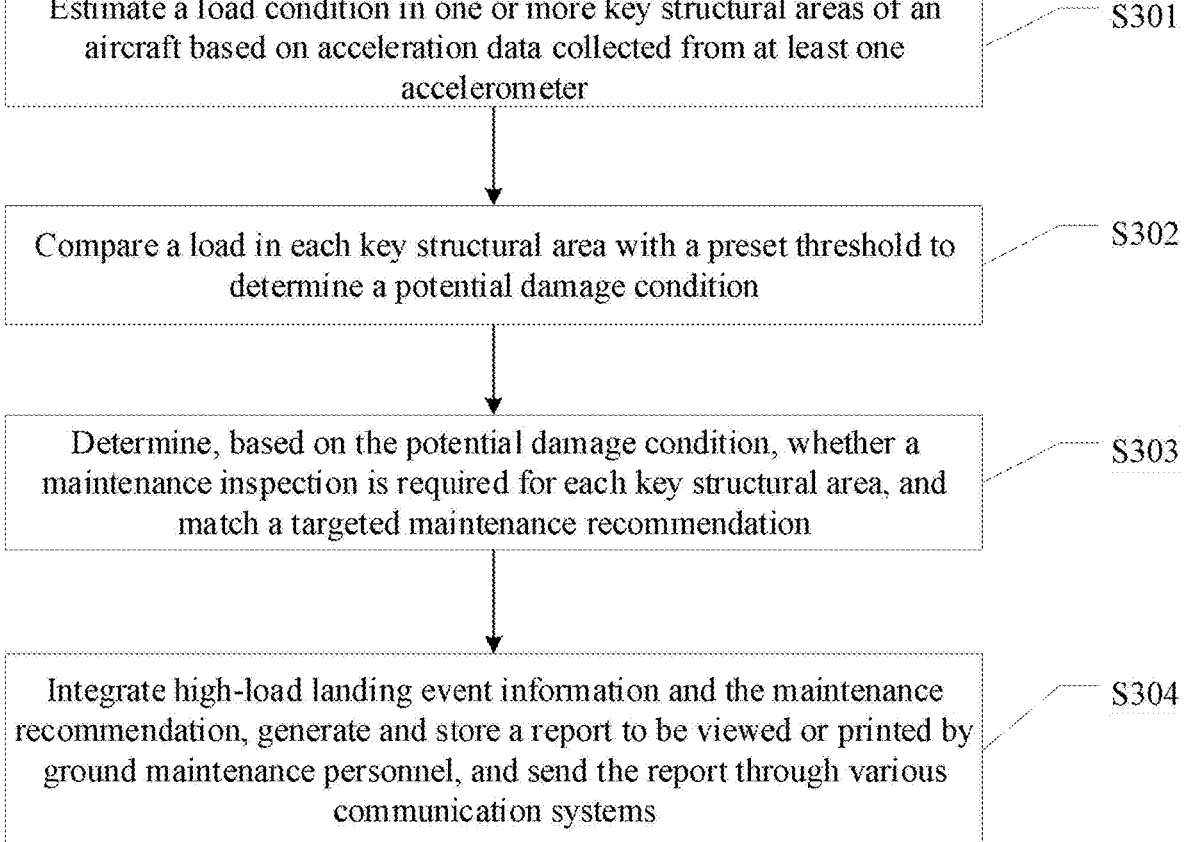

Estimate a load condition in one or more key structural areas of an aircraft based on acceleration data collected from at least one accelerometer                    S301

Compare a load in each key structural area with a preset threshold to determine a potential damage condition                    S302

Determine, based on the potential damage condition, whether a maintenance inspection is required for each key structural area, and match a targeted maintenance recommendation                    S303

Integrate high-load landing event information and the maintenance recommendation, generate and store a report to be viewed or printed by ground maintenance personnel, and send the report through various communication systems                    S304

FIG. 3

AIRCRAFT HIGH-LOAD LANDING EVENT DETECTION, CLASSIFICATION AND MAINTENANCE GUIDANCE METHODS

CROSS REFERENCE TO THE RELATED APPLICATIONS

This application is the national phase entry of International Application No. PCT/CN2024/101374, filed on Jun. 25, 2024, which is based upon and claims priority to Chinese Patent Application No. 202311288942.X, filed on Oct. 8, 2023, the entire contents of which are incorporated herein by reference.

TECHNICAL FIELD

The present disclosure relates to the technical field of aircraft high-load landing event detection, and in particular to aircraft high-load landing event detection, classification and maintenance guidance methods, and a corresponding detection system.

BACKGROUND

A hard landing refers to an aircraft landing with excessively large vertical acceleration or a landing load exceeding a given limit, which can cause damage to corresponding structural parts of the aircraft. In a broad sense, a hard landing encompasses various abnormal landings that occur due to excessive sinking rate, excessive landing weight, and incorrect attitude, etc., and can cause key structures of the aircraft to bear landing loads beyond design limits, thereby leading to damage. These landing events are collectively referred to as high-load landing events. Many cracks or scratches can be detected through visual inspection, but inconspicuous damage may be overlooked in the absence of flaw detection using instruments and become a safety hazard for the next flight. In addition, due to the fact that high-load landing events are accidental accidents during aircraft operation, maintenance costs for high-load landing events are relatively high and can cause delays in the next flight of the aircraft. Due to the lack of supporting comprehensive damage data, detailed maintenance of the entire aircraft is often required after the occurrence of a high-load landing event for safety reasons. During this process, unnecessary maintenance and inspection procedures will further increase operational costs. Therefore, it is necessary for accurate and timely determination of high-load landing events along with condition-based maintenance (CBM) techniques, to avoid frequent, time-consuming and costly maintenance procedures while further improving the safety and economy of aircraft operation.

Initially, the determination of high-load landing events mainly relies on the pilot's experience and perception, but in actual operation, it has been found that the pilot's subjective determination may have significant discrepancies with the actual situation. Therefore, aircraft manufacturers have introduced some flight parameters to assist in the detection and determination of high-load landing events. For example, Boeing determines whether a high-load landing event occurs by checking whether the aircraft's vertical acceleration, roll angle and landing weight exceed threshold values. Some of the parameters can be viewed through the Multiple-Function Control Display Unit (MCDU). Airbus has created Load Report <15> that can be automatically triggered by the Aircraft Communications Addressing and Reporting System (ACARS) or manually accessed by the Aircraft Integrated Data System (AIDS) through the MCDU in case of abnormal conditions such as excessively large radio altitude rate, excessively large vertical acceleration, and excessively large landing weight. This report records flight parameters including aircraft weight, radio altitude rate, vertical acceleration, and aircraft attitude, etc. Maintenance personnel can further confirm whether a high-load landing event occurs by reading this report.

The above are the prior methods for detecting and determining high-load landing events, but they only serve as an auxiliary means, and the determination of high-load landing events mainly depends on the flight crew. If the crew does not perceive or report the possibility of a high-load landing event, ground maintenance personnel often do not retrieve the corresponding flight parameters for confirmation, thereby posing a risk of missed detections. Boeing and Airbus both use accelerometers mounted near the aircraft center of gravity to detect the vertical acceleration, which is an important criteria for detecting high-load landing events. The sampling rate of the accelerometer is low, usually only 8 Samples per second, making it hard to accurately capture the peak acceleration. Therefore, it is insufficiently accurate to use the detected data to determine a high-load landing event or to represent loads at other key structural parts of the aircraft, such as landing gears, tail, and wings. If the aircraft lands in an abnormal attitude, such as with a large roll angle, the peak acceleration recorded at the aircraft's center of gravity may be much lower than the determination threshold, while there still exists the possibility of structural damage due to one part of the landing gear touching down before the others and individually bearing the entire landing load.

In response to the above issues, aircraft manufacturers, airlines, universities and other relevant institutions have conducted studies in recent years to improve the high-load landing event detection technology. Some studies introduce mechanical indicating devices to the landing gears to improve the indication of high-load landing events. However, these studies only focus on the landing loads on the landing gears, with simple detection methods and are unable to provide data analysis. Some studies identify and classify high-load landing events by acquiring and analyzing quick access recorder (QAR) data of the aircraft. However, QAR data must be decoded by airlines which is a lengthy process and QAR data does not capture all the necessary information to provide timely post-flight detection and directed maintenance for bringing the f aircraft back into service. Some studies consciously collect relevant flight parameters each time the aircraft touches the ground during the landing process for comprehensive analysis. This improves the credibility of the analysis results, however, such studies still face the problem of inaccurate results due to low sampling rate of flight parameters and a lack of acceleration data at key positions. In light of this issue, Messier-Dowty et al. from Canada proposed using an inertial measurement unit (IMU) with a high sampling rate to record acceleration values and analyze them in conjunction with avionics data to improve data accuracy. This method involves installing an expensive sensor with an embedded processor and separable IMU into areas that need to be monitored. As more comprehensive data is required, the size and weight of the product will increase, as will the difficulty of installing the sensor into key structural locations which can have extremely demanding environmental conditions such as landing gears and wings Ion Stiharu et al. from Canada collected the corresponding data through accelerometers additionally installed in key parts of the aircraft to calculate critical values including stress, energy, etc., and compared them with thresholds to determine whether a high-load landing event occurs. This method improves the accuracy of detection through more comprehensive data, but it has relatively high computational complexity, and it does not provide real-time detection and directed maintenance advice for high-load landing events.

Overall, high-load landing event detection technology has had improvements, but there are still certain shortcomings in terms of timeliness of detection, robustness, comprehensiveness, accuracy of data, feasibility and economy of implementation.

SUMMARY

In view of the above shortcomings of the prior art, the present disclosure provides aircraft high-load landing event detection, classification and maintenance guidance methods, and a corresponding detection system. The present disclosure features high timeliness and accuracy.

To achieve the above objective, the present disclosure adopts the following technical solutions:

In a first aspect, the present disclosure proposes an aircraft high-load landing event detection method, including:

monitoring, in real time, one or more flight parameters received from an avionics bus;

monitoring, in real time, one or more accelerometers installed on an aircraft, and performing sampling at a rate greater than a flight parameter sampling rate;

monitoring, in real time, one or more landing data signals including at least an acceleration value and/or a flight parameter, and performing a comparison based on at least one preset threshold to determine whether a high-load landing event occurs;

storing at least one piece of landing data in response to a detection of at least one storage triggering condition; and ending landing data monitoring and storage in response to a detection of at least one landing completion triggering condition.

In a second aspect, the present disclosure proposes an aircraft high-load landing event classification method, including:

extracting, based on one or more of flight parameters stored in a first set, a touchdown event from stored acceleration data, where the acceleration data is measured by each accelerometer;

comparing one or more accelerometer measured values with a corresponding preset threshold to determine an acceleration exceedance event and a severity thereof in the touchdown event;

extracting one or more feature parameters of the touchdown event to form a parameter value table;

fusing all stored landing data, and further analyzing and extracting one or more of flight parameters in a second set and/or a feature of a descent rate in the touchdown event to form an extended parameter value table;

evaluating the extended parameter value table based on a high-load landing event classification rule, and identifying a type of a high-load landing event through a classification algorithm; and notifying, based on the type and severity of the high-load landing event, maintenance personnel, flight crew, airline management, an aircraft manufacturer, a regulatory agency, or any combination thereof through a relevant mechanism.

In a third aspect, the present disclosure proposes a high-load landing event maintenance guidance method, including:

estimating a load condition in one or more key structural areas of an aircraft based on acceleration data collected from at least one accelerometer;

comparing a load in each key structural area with a preset threshold to determine a potential damage condition;

determining, based on the potential damage condition, whether a maintenance inspection is required for each key structural area, and matching a targeted maintenance recommendation; and integrating high-load landing event information and the maintenance recommendation, generating and storing a report to be viewed or printed by ground maintenance personnel, and sending the report through various communication systems.

In a fourth aspect, the present disclosure proposes an aircraft high-load landing event detection system, including:

one or more accelerometers, located at a selected position on an aircraft, and configured to collect, in real time, acceleration data during an aircraft landing process;

a data acquisition unit, configured to collect, at a high sampling rate, the acceleration data transmitted by the accelerometer and perform processing and digitization;

an acceleration data processing unit, configured to receive the acceleration data, monitor the acceleration data in real time, process and analyze collected data, and extract a touchdown event and a feature thereof;

a storage unit, configured to store landing data;

a data processor, located in a central computer of the aircraft or combined with a specialized hardware component, and including:

a detection module, configured to receive a flight parameter and monitor the flight parameter in real time to assist in determining whether a high-load landing event occurs;

a classification module, configured to process, fuse and analyze the stored landing data to determine an occurrence, type, and severity of the high-load landing event;

a maintenance recommendation module, configured to calculate and estimate an aircraft landing load and a distribution thereof based on accelerometer data, match a targeted maintenance inspection action recommendation for the high-load landing event, and generate a high-load landing event report;

an interface module, configured to receive data from an avionics bus, transmit the high-load landing event report, and send a relevant notification to an interested party;

a threshold database, configured to provide a threshold for determining the high-load landing event and a severity thereof;

a load distribution table, configured to provide a stress distribution estimate of a load at one or more key nodes of the aircraft in one or more key structural areas; and a maintenance action table, configured to provide maintenance action recommendations for different types and severities of high-load landing events.

The present disclosure has the following beneficial effects:

(1) In the present disclosure, accelerometers are installed at multiple specific structural locations on the aircraft to monitor in real time the landing loads borne by each structural location during the landing process. Threshold values are set for key parameters of the measured data and real-time signal processing is performed to detect the possibility of a high-load landing event online., The present disclosure collects complete and accurate landing data online and performs an analysis to determine the type and extent of the high-load event during the landing process. The present disclosure can reduce the determination of high-load landing event on the pilot's perception and experience, and does not need to wait for decoding of QAR data, greatly improving the accuracy and timeliness of high-load landing event detection.

(2) The present disclosure is based on the comprehensive analysis of data from accelerometers at multiple different positions and key flight parameters to determine the type of a high-load landing event, and to provide more detailed classification of high-load landing events to assist ground maintenance personnel by providing directed maintenance to evaluate the damage condition of the aircraft during landing. In addition, the present disclosure analyzes and estimates the landing loads borne by key structural areas of the aircraft, and provides targeted maintenance recommendations, to assist ground maintenance personnel in inspection and maintenance, and to carry out CBM as needed. The present disclosure reduces unnecessary maintenance procedures and manpower investment to enable the aircraft to return to service as soon as possible, thereby lowering the operational cost of the aircraft.

(3) The present disclosure combines multiple technologies such as accelerometer applications, data processing, detection and classification algorithms, system integration, and continuous monitoring of the aircraft landing status using comprehensive, complete, and real-time accelerometer data. These combined technologies eliminate the guessing caused by limited and inaccurate data. Therefore, the present disclosure can accurately detect the occurrence of high-load landing events, avoid risks caused by missed or false detections, and improve the safety and reliability of aircraft operation.

(4) The present disclosure discloses how the software algorithms can reside in the central computer of the aircraft and how existing computing and hardware resources can be used to make the monitoring hardware as miniaturized and lightweight as possible, which matches the strict requirements for minimized weight and space of on board aircraft systems

BRIEF DESCRIPTION OF THE DRAWINGS

FIG. 1 is a flowchart of an aircraft high-load landing event detection method according to Embodiment 1;

FIG. 2 is a flowchart of an aircraft high-load landing event classification method according to Embodiment 2;

FIG. 3 is a flowchart of an aircraft high-load landing event maintenance guidance method according to Embodiment 3.

DETAILED DESCRIPTION OF THE EMBODIMENTS

Figure 4:
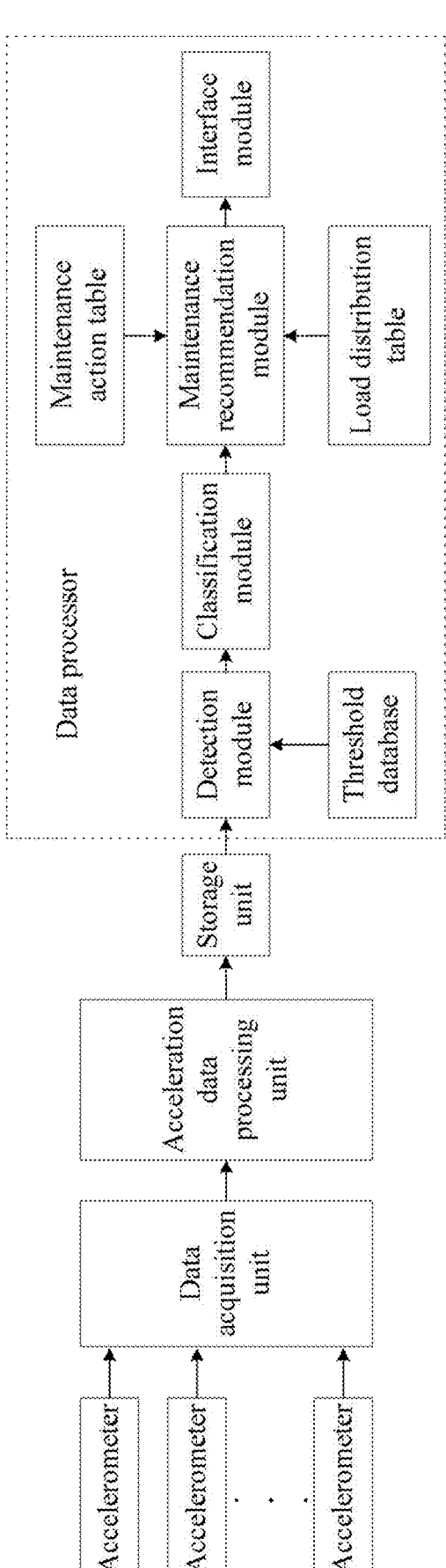
FIG. 4 is a structural diagram of an aircraft high-load landing event detection system according to Embodiment 4.

The specific embodiment of the present disclosure will be described below so that those skilled in the art can understand the present disclosure, but it should be clear that the present disclosure is not limited to the scope of the specific embodiment. For those of ordinary skill in the art, as long as various changes fall within the spirit and scope of the present disclosure defined and determined by the appended claims, these changes are apparent, and all inventions and creations using the concept of the present disclosure are protected.

Embodiment 1

As shown in FIG. 1, the embodiment of the present disclosure provides an aircraft high-load landing event detection method, including steps S101 to S105 below.

S101. One or more flight parameters received from an avionics bus are monitored in real time.

S102. One or more accelerometers installed on an aircraft are monitored in real time, and sampling is performed at a rate greater than a flight parameter sampling rate.

S103. One or more landing data signals including at least an acceleration value and/or a flight parameter are monitored in real time, and a comparison is performed based on at least one preset threshold to determine whether a high-load landing event occurs.

S104. At least one piece of landing data is stored in response to a detection of at least one storage triggering condition; and S105. Landing data monitoring and storage is ended in response to a detection of at least one landing completion triggering condition.

In an optional embodiment of the present disclosure, in the steps S101 and 102, triggering conditions are set for real-time and accurate monitoring of aircraft high-load landing events. Specifically, a condition for triggering real-time monitoring of the flight parameter and the accelerometer includes a detection of an altitude of the aircraft below a threshold and/or a landing gear extended. The triggering conditions limit the operating scenario of the system to be the key stage when the aircraft is about to land. The corresponding landing data signals before this stage will not be processed or stored to avoid wasting onboard computing or storage resources. There are two triggering conditions set to avoid the situation where one of the data signals fails, improving the timeliness and accuracy of aircraft high-load landing event detection. Generally speaking, in this embodiment, when the radio altitude of the aircraft drops to 50 feet, the conditions for real-time monitoring of the flight parameter and accelerometer data are triggered.

In an optional embodiment of the present disclosure, in order to achieve accurate detection of aircraft high-load landing events, in the step 102, at least one or more accelerometers installed on the aircraft are monitored in real time to acquire acceleration values during the aircraft's high-load landing process. The one or more accelerometers are multi-axis accelerometers configured to provide acceleration values in multiple directions. During the actual landing process of an aircraft, due to the possible mutual influence of accelerations in the three axes, the acceleration data in the three directions are considered to achieve more accurate determination. In addition, the determination of high lateral overload landing types requires reference to lateral acceleration data. Therefore, using three-axis accelerometers can reduce the number of accelerometers arranged on the corresponding structural components of the aircraft, reduce the impact of installing accelerometers on the aircraft structure, and achieve accurate detection of high-load landing events.

The current aircraft high-load landing event detection method only uses data from one accelerometer located at the center of gravity of the aircraft. The acceleration data at the center of gravity is hard to detect the loads borne by other key structures during landing, which makes the determination of high-load landing events incomplete and may result in missed detections. Once it is determined that a high-load landing event has occurred, in the absence of corresponding data support, a complete maintenance procedure needs to be executed to ensure aircraft safety. However, the maintenance is costly and increases the time for the aircraft to be grounded. In order to solve the above problem, in this embodiment, preferably, the at least one or more accelerometers installed on the aircraft are located at one or more key structural positions on the aircraft. The one or more key structural positions include the center of gravity or positions close to the center of gravity of the aircraft, as well as positions adjacent to the connections between the main structure of the aircraft and the front landing gear, left main landing gear, right main landing gear, left wing, right wing, and tail. In this embodiment, the accelerometers installed on multiple key structural components can significantly improve the accuracy and directionality of high-load landing event determination. The more comprehensive data is helpful to more accurately locate structures that may be damaged due to high-load landing events, thereby achieving CBM.

In this embodiment, one or more accelerometers are installed at one or more key structural positions to detect the vertical and lateral acceleration changes of corresponding parts during the aircraft landing process, monitor the landing loads borne by each structural part in real time during the aircraft landing process, and monitor flight parameters related to landing. In addition, threshold values are set for each landing data for real-time signal comparison to detect online whether a high-load landing event occurs.

In an optional embodiment of the present disclosure, in the step S101, when the detection of a high-load landing event of the aircraft is triggered, one or more flight parameters received from the avionics bus are monitored in real time. The one or more flight parameters include a pitch angle, a roll angle, a radio altitude, a drift angle, a rudder position, a gross weight, a ground speed, a wheel load signal, a landing gear extension/retraction status, a time, a date, or any combination thereof. This embodiment can more comprehensively and accurately determine the type of a high-load landing event through the above flight parameters. The pitch angle is used to determine a three-point landing, a landing with the front landing gear touching down first, and a tail strike landing. The roll angle is used to determine an off-center landing and a wingtip/nacelle strike. The radio altitude and gross weight are used to determine a symmetrical landing and an overweight landing. The ground speed, wheel load signals, and time are used to assist algorithms in extracting a touchdown event from acceleration data. The date is used for a final landing report.

This embodiment monitors the selected flight parameter of the aircraft and the acceleration values of the key structural positions of the aircraft in real time to form a landing data signal. It determines whether the landing data signal exceeds the limit to determine whether a high-load landing event occurs, thereby achieving high-load landing event detection of the aircraft.

In an optional embodiment of the present disclosure, a storage triggering condition and a landing completion triggering condition are generated based on the touchdown event of the aircraft during the high-load landing event detection process. Specifically, the detection of the at least one storage triggering condition includes the detection of a first landing data signal of the aircraft that exceeds a threshold, and the detection of the at least one landing completion triggering condition includes the detection of a last touchdown event of the aircraft. In this embodiment, the touchdown event includes a touchdown of any one of the three landing gears of the aircraft, any one of the two wings, any one of the two engine nacelles, the tail, or any combination thereof.

If no landing data signal exceeds the threshold and no tail, wing, or engine component touches down during the entire aircraft landing process, it indicates that no high-load landing event occurs. In this case, there is no need for subsequent data processing, calculation, analysis, classification, and maintenance recommendation matching, nor is there a need to store relevant landing data. Therefore, in this embodiment, the storage triggering condition is to store the data only after it is detected that any landing data signal exceeds the threshold, in order to ensure the necessity of storing the data and reduce the burden on the onboard storage unit.

Similarly, since it is hard for a high overload condition to occur after the aircraft completes landing and enters the taxiing phase, there is no need to store and analyze data during the aircraft's taxiing phase. Therefore, in this embodiment, the landing completion triggering condition is to end data storage after the last touchdown event of the aircraft is detected, in order to ensure the validity of the stored data.

The aircraft may collide with the ground and generate high-loads only after landing on the ground. In cases where the aircraft has made multiple touchdowns before finally completing the landing and entering the taxiing phase, only the data from the aircraft during the touchdown phase is valid. Therefore, in this embodiment, the contact between the landing gear, wings, engine nacelles, or tail structure and the ground is considered as a touchdown event, and the acceleration data of the aircraft during the touchdown phase is extracted and retained, while the acceleration data of the aircraft in flight is removed to reduce the computational load.

In an optional embodiment of the present disclosure, the stored landing data includes a descent rate calculated based on the received radio altitude data. According to Article 473 *"Landing Load Conditions and Assumptions"* of CCAR-25 *"Airworthiness Standards for Transport Category Airplanes"*, the limited descent rate under the design landing weight (maximum weight in the maximum descent rate landing condition) is 3.05 m/s (10 ft/s). Therefore, the descent rate (i.e. sinking speed) is an important condition to consider in determining high-load landing events.

Embodiment 2

As shown in FIG. 2, the embodiment of the present disclosure provides an aircraft high-load landing event classification method, including steps S201 to S206 below.

S201. Based on one or more of flight parameters stored in a first set, a touchdown event is extracted from stored acceleration data, where the acceleration data is measured by each accelerometer.

S202. One or more accelerometer measured values are compared with a corresponding preset threshold to determine an acceleration exceedance event and a severity thereof in the touchdown event.

S203. One or more feature parameters of the touchdown event are extracted to form a parameter value table.

S204. All stored landing data are fused, and one or more of flight parameters in a second set and/or a feature of a descent rate in the touchdown event are further analyzed and extracted to form an extended parameter value table.

S205. The extended parameter value table is evaluated based on a high-load landing event classification rule, and the type of a high-load landing event is identified through a classification algorithm.

S206. Based on the type and severity of the high-load landing event, maintenance personnel, flight crew, airline management, an aircraft manufacturer, a regulatory agency, or any combination thereof are notified through a relevant mechanism.

In an optional embodiment of the present disclosure, the first set of flight parameters includes a temporal wheel load signal, a ground speed, a radio altitude, or any combination thereof. In order to extract a touchdown event, it is necessary to use wheel load signals, radio altitude, and ground speed to assist in determining whether the aircraft is on the ground or in flight. For example, when the aircraft is on the ground, the wheel load signal of the aircraft is ground and the radio altitude is close to 0. Ground speed is used to assist in determining the last touchdown event of an aircraft. After the last touchdown of the aircraft, there will be no significant changes in the wheel load signal and radio altitude. When the ground speed drops to a certain threshold, it indicates that the aircraft has slowed down, completed landing, and entered the taxiing phase. That is to say, in this embodiment, in the step S201, the touchdown event is extracted from the stored acceleration data measured by each accelerometer based on a temporal wheel load signal, a ground speed, a radio altitude, or any combination thereof.

In an optional embodiment of the present disclosure, the range of acceleration values sensed by accelerometers at different positions during landing is different. For example, the landing gear may bear most of the landing load, and even in case of a normal landing, the acceleration at this part will exceed the acceleration close to the center of gravity because the load is already buffered by multiple layers of structure when transmitted to the center of gravity. Therefore, different exceedance thresholds should be set for the acceleration data measured by accelerometers at different positions to achieve effective exceedance detection. Similarly, the threshold reflecting the severity of the exceedance should vary. Therefore, in this embodiment, in the step S202, exceedance thresholds corresponding to different severities are set for the data measured by accelerometers located at different positions. By comparing the measured values of one or more accelerometers located at different key structural positions of the aircraft with corresponding preset thresholds, acceleration exceedance events and their severities in touchdown events can be more accurately determined.

In an optional embodiment of the present disclosure, in the step S203, one or more feature parameters of the touchdown event are extracted to form a parameter value table. Specifically:

Based on a change in a digital sensing signal and the radio altitude, wheel load signal, and ground speed in the flight parameter data, a count of touchdowns made by the aircraft during landing is determined.

A time-domain analysis is performed on the landing data signal to determine a time-domain feature extraction window.

A time-domain waveform feature of the digital sensing signal is extracted through the time-domain feature extraction window, and the occurrence, count, event, and feature parameters of exceedance events are determined based on the time-domain waveform feature.

The count of touchdowns, and the occurrence, count, event, and feature parameters of exceedance events of the aircraft during landing are recorded in the parameter value table.

In this embodiment, in the step S203, the one or more feature parameters recorded in the parameter value table include a count of all touchdown events, an acceleration exceedance condition of each touchdown event, a maximum acceleration value and an occurrence time and position of the acceleration exceedance event, a time-domain feature of an acceleration change curve, or any combination thereof. This embodiment evaluates the above parameters and accurately classifies the events according to the high-load landing event classification rule. For example, the count of touchdown events determines whether multiple touchdowns occur, the acceleration exceedance of each touchdown event determines the position and severity of potential damage to the structure, the maximum acceleration value in the touchdown event is used to estimate the landing load, the time is used to determine the temporal relationship of each exceedance event, and the time-domain feature is used to evaluate a potential damage condition.

In an optional embodiment of the present disclosure, in the step S204, all the stored landing data are fused. The recorded sensor data, the flight parameter, and the calculated descent rate are subjected to time alignment and sampling rate unification, and touchdown events that occur at a same time among those extracted from the acceleration data are merged. This embodiment integrates sensor data with flight parameters and merges touchdown events that occur within the same time to assist in the classification of high-load landing events and improve classification accuracy. For example, in a touchdown event where the roll angle is greater than a certain threshold and the sensor data of the wing exceeds the preset threshold, it is highly likely that the touchdown is a wingtip/nacelle strike, thereby avoiding erroneous determination caused by a single data source.

In this embodiment, the second set of flight parameters includes the gross weight, temporal pitch angle, roll angle, drift angle, rudder position, or any combination thereof. That is to say, in this embodiment, in the step S204, the above flight parameters or any combination thereof and/or the feature of the descent rate form an extended parameter value table, further achieving accurate determination of the type of the high-load landing event.

In an optional embodiment of the present disclosure, in the step S205, the high-load landing event classification rule specifically includes the following content.

a) Symmetrical Landing

1) The gross weight is less than the maximum landing weight of the aircraft.

2) The descent speed or maximum vertical acceleration measured by any accelerometer exceeds a given threshold.

3) The earliest vertical acceleration exceedance event in the main landing gears on both sides occurs before the vertical acceleration exceedance event measured by any other accelerometer.

4) The time difference between the touchdown events of the left main landing gear and right main landing gear is less than a given duration. Specifically, a symmetrical landing should meet the requirements of "1) and 2) and 3) and 4)".

b) Overweight Landing

1) The gross weight is greater than the maximum landing weight of the aircraft.

2) The descent speed or maximum vertical acceleration measured by any accelerometer exceeds a given threshold.

Specifically, an overweight landing should meet the requirements of "1) and 2)".

c) Off-Center Landing
1) The gross weight is less than the maximum landing weight of the aircraft.
2) The descent speed or maximum vertical acceleration measured by any accelerometer exceeds a given threshold.
3) The earliest vertical acceleration exceedance event in the main landing gears on both sides occurs before the vertical acceleration exceedance event measured by any other accelerometer.
4) The time difference between the touchdown events of the left main landing gear and right main landing gear is greater than a given duration.
5) The maximum absolute value of the roll angle exceeds a given threshold.

Specifically, an off-center landing should meet the requirements of "1) and 2) and 3) and (4) or 5))".

d) Lateral Landing
1) The gross weight is less than the maximum landing weight of the aircraft.
2) The aircraft rudder position or maximum absolute value of the drift angle exceeds a given threshold.

Specifically, a lateral landing should meet the requirements of "1) and 2)".

e) Landing With the Front Landing Gear Touching Down First
1) The gross weight is less than the maximum landing weight of the aircraft.
2) The descent speed or maximum vertical acceleration measured by any accelerometer exceeds a given threshold.
3) The acceleration exceedance event of the front landing gear occurs before the acceleration exceedance event measured by any other accelerometer.
4) The maximum pitch angle is less than a given threshold.

Specifically, a landing with the front landing gear touching down first should meet the requirements of "1) and 2) and (3) or 4))".

f) Three-Point Landing:
1) The gross weight is less than the maximum landing weight of the aircraft.
2) The descent speed or maximum vertical acceleration measured by any accelerometer exceeds a given threshold.
3) The time difference between the touchdown events of the front landing gear and the main landing gear at either side is less than a given duration.
4) The maximum absolute value of the pitch angle is less than a given threshold. Specifically, a three-point landing should meet the requirements of "1) and 2) and (3) or 4))".

g) Tail Strike
1) The gross weight is less than the maximum landing weight of the aircraft.
2) The descent speed or maximum vertical acceleration measured by any accelerometer exceeds a given threshold.
3) The maximum pitch angle is greater than a given threshold.

4) The tail of the aircraft touches down Specifically, a tail strike should meet the requirements of "1) and 2) and (3) or 4))".

h) Wingtip/Nacelle Strike
1) The gross weight is less than the maximum landing weight of the aircraft.
2) The descent speed or maximum vertical acceleration measured by any accelerometer exceeds a given threshold.
3) The maximum absolute value of the roll angle exceeds a given threshold.
4) Either wingtip or nacelle of the aircraft touches down.

Specifically, a wingtip/nacelle strike should meet the requirements of "1) and 2) and (3) or 4))".

i) High Lateral Overload Landing
1) The gross weight is less than the maximum landing weight of the aircraft.
2) The aircraft rudder position and the maximum absolute value of the drift angle fall within a given threshold.
3) The maximum lateral acceleration of any three-axis accelerometer of the aircraft exceeds a given threshold.

Specifically, a high lateral overload landing should meet the requirements of "1) and 2) and 3)".

In this embodiment, in the step S205, the types of high-load landing events determined include symmetrical landing, overweight landing, off-center landing, lateral landing, landing with the front landing gear touching down first, three-point landing, tail strike landing, wingtip/nacelle strike landing, high lateral overload landing, or any combination thereof.

Embodiment 3

As shown in FIG. 3, the embodiment of the present disclosure provides a high-load landing event maintenance guidance method, including steps S301 to S304 below.

S301. A load condition in one or more key structural areas of an aircraft is estimated based on acceleration data collected from at least one accelerometer.

S302. A load in each key structural area is compared with a preset threshold to determine a potential damage condition.

S303. Based on the potential damage condition, it is determined whether a maintenance inspection is required for each key structural area, and a targeted repair action recommendation is matched.

S304. High-load landing event information and the maintenance recommendation are integrated, a report to be viewed or printed by ground maintenance personnel is generated and stored, and the report is sent through various communication systems.

In an optional embodiment of the present disclosure, in the step S301, the load condition in the one or more key structural areas of the aircraft is estimated based on acceleration data collected by at least one accelerometer located at a key structural position of the aircraft. The central computer computing resources of the aircraft are limited, and the evaluated load condition will be used to determine the maintenance strategy. In consideration of this, in this embodiment, a simple finite element analysis and multiple experimental tests are conducted on the aircraft structure in advance to acquire the distribution of different loads on the entire structural component at the node where the accelerometer is located, forming a load distribution table. Then, based on the actual maximum acceleration value collected by the accelerometer, the actual load at that node is analyzed. Finally, based on the load distribution table, the load distribution that is closest to the actual load value is acquired as the estimated load for the structural area. The design reduces computational complexity and time, and improves timeliness.

In this embodiment, the estimated one or more key structural areas of the aircraft include the aircraft's fuselage, front landing gear, left main landing gear, right main landing gear, left wing and left engine, right wing and right engine, tail, or any combination thereof. In this embodiment, these aircraft areas are prone to damage after a high-load landing event occurs and are subject to a key evaluation.

In this embodiment, in the estimation of the load condition in the one or more key structural areas of the aircraft, the landing load at a node where each accelerometer is located is calculated based on acceleration data collected by at least one accelerometer, and the stress distribution of each key structural area is estimated. The stress values borne by each key structural area are estimated, and these stress values are compared with the stress threshold that each area is expected to withstand to identify areas with a high risk of damage and requiring maintenance, as well as areas with a low risk of damage and where the maintenance procedure can be omitted. The design shortens maintenance time and saves aircraft operating costs while ensuring the implementation of necessary maintenance projects.

In this embodiment, the stress distribution in each key structural area is estimated based on the load at the node where each accelerometer is located. Specifically, test values that are close to the actual load at the node where each accelerometer is located are searched in the predefined load distribution table to determine the load distribution.

In an optional embodiment of the present disclosure, in the step S303, the matched targeted maintenance recommendation includes maintenance action recommendations formulated for high-load landing events of different types and severities based on an aircraft maintenance manual. The maintenance action is divided into multiple stages, with a result of a previous stage triggering different action strategies for a subsequent stage. In this embodiment, based on the types of high-load landing events and the resulting landing load stress distribution, the areas that require maintenance are accurately located, and targeted maintenance recommendations are matched to eliminate unnecessary maintenance steps. Meanwhile, for areas that require maintenance, a phased maintenance strategy is implemented, where the results of the previous stage's inspection determine whether to proceed to a more detailed inspection in the next stage, simplifying maintenance procedures and further shortening maintenance time.

In an optional embodiment of the present disclosure, in the step S304, the high-load landing event information includes flight information, high-load landing event types, and key landing data. In this embodiment, the above information is recorded in the high-load landing event report to provide reference for maintenance personnel to develop specific maintenance steps, and is stored as historical data for future use.

In this embodiment, the key landing data includes the aircraft's landing weight, count of touchdown events, maximum vertical and lateral accelerations at the center of gravity during each touchdown, maximum values and positions of all acceleration signals exceeding the threshold, descent rate, attitude, rudder position, or any combination thereof. The above key landing data are the basis for determining the type of the high-load landing event and locating the possible damaged areas and their severity. In this embodiment, these key landing data are provided to assist ground maintenance personnel in understanding the specific situation of the event, in order to expand and adjust the maintenance recommendations provided in the report.

Embodiment 4

As shown in FIG. 4, the embodiment of the present disclosure provides an aircraft high-load landing event detection system. Components of the aircraft high-load landing event detection system are described below.

One or more accelerometers are located at a selected position on an aircraft, and configured to collect, in real time, acceleration data during an aircraft landing process.

A data acquisition unit is configured to collect, at a high sampling rate, the acceleration data transmitted by the accelerometer and perform processing and digitization.

An acceleration data processing unit is configured to receive the acceleration data, monitor the acceleration data in real time, process and analyze collected data, and extract a touchdown event and a feature thereof.

A storage unit is configured to store landing data.

A data processor is located in a central computer of the aircraft or combined with a specialized hardware component, and components of the data processor are described below.

A detection module is configured to receive a flight parameter and monitor the flight parameter in real time to assist in determining whether a high-load landing event occurs.

A classification module is configured to process, fuse and analyze the stored landing data to determine an occurrence, type, and severity of the high-load landing event.

A maintenance recommendation module is configured to calculate and estimate an aircraft landing load and a distribution thereof based on accelerometer data, match a targeted maintenance inspection action recommendation for the high-load landing event, and generate a high-load landing event report.

An interface module is configured to receive data from an avionics bus, transmit the high-load landing event report, and send a relevant notification to an interested party.

A threshold database is configured to provide a threshold for determining the high-load landing event and a severity thereof.

A load distribution table is configured to provide a stress distribution estimate of a load at one or more key nodes of the aircraft in one or more key structural areas.

A maintenance action table is configured to provide maintenance action recommendations for different types and severities of high-load landing events.

In an optional embodiment of the present disclosure, the storage unit includes a circular buffer and a non-volatile storage unit that are respectively configured to store landing data before and after a detection of at least one storage triggering condition, in order to reduce storage burden.

In this embodiment, the memory is divided into a circular buffer unit and a non-volatile storage unit. The circular buffer unit is configured to store all landing data signals sent by the acceleration data processing unit and the detection module before at least one storage triggering condition is detected, and then send all currently stored landing data signals to the non-volatile storage unit. The non-volatile memory is configured to store all landing data signals sent by the acceleration data processing unit and detection module after the detection of at least one storage triggering condition, and send all stored landing data signals to the classification module after a landing is completed. In this embodiment, the circular buffer unit and the non-volatile storage unit are divided to store all collected landing data signals in different storage methods, ensuring data security and non-redundancy in case the aircraft encounters a high-load landing event.

In an optional embodiment of the present disclosure, the acceleration data processing unit and the detection module are configured to detect at least one real-time monitoring triggering condition, at least one storage triggering condition, and at least one landing completion triggering condition based on data from the accelerometer and the flight parameter.

In an optional embodiment of the present disclosure, the classification module includes a classification rule and classification algorithm based on different levels of thresholds for different landing data. In this embodiment, the classification rule is formulated based on the definition of the type of high-load landing event to identify the type and severity of a high-load landing event when the corresponding landing data values reach preset thresholds at different levels. All landing data are processed, fused, and comprehensively analyzed through the classification algorithm, and the data in the parameter value table are evaluated to output an event type result according to the classification rule.

In an optional embodiment of the present disclosure, the high-load landing event report includes the following content:

(1) the date, aircraft type, and flight number of this flight;

(2) key landing data, including the aircraft's landing weight, maximum vertical and lateral accelerations at the center of gravity, maximum values and positions of all acceleration signals exceeding the threshold, count of touchdown events, descent rate, and attitude at each touchdown, or any combination thereof;

(3) type of this high-load landing event;

(4) the area that bears the maximum stress; and (5) recommended inspection and maintenance procedures.

In an optional embodiment of the present disclosure, the threshold database includes one or more acceleration thresholds varying with the installation positions, one or more flight parameter thresholds, and an allowable stress threshold for one or more key structural areas of the aircraft. Each threshold includes at least one level of values to reflect different severities. In this embodiment, the above data is stored in the threshold database to determine whether a high-load landing event occurs and its severity based on the acceleration threshold and flight parameter threshold, and to determine whether maintenance is required in the key structural area based on the stress threshold that the area can withstand.

In an optional embodiment of the present disclosure, the one or more flight parameter thresholds include the aircraft's landing weight threshold, descent rate threshold, pitch angle threshold, roll angle threshold, drift angle threshold, rudder position threshold, or any combination thereof. In this embodiment, the above flight parameter thresholds are stored as an important criterion for determining high-load landing events, and are compared with the actual measured values to detect in real time whether a high-load landing event occurs.

This embodiment provides an aircraft high-load landing event detection system. During the landing process of an aircraft, the system collects complete and accurate landing data online and performs an analysis and calculation to determine whether a high-load landing event occurs and determine the type of the high-load landing event. The system can reduce the dependence of high-load landing event determination on the pilot's perception and experience, and does not need to wait for decoding of QAR data, greatly improving the accuracy and timeliness of high-load landing event detection. In addition, the detection algorithm of the system resides in the central computer of the aircraft and utilizes existing computing resources and some hardware resources to make the hardware as miniaturized and lightweight as possible, which is more conforming to the strict requirements for weight and space of airborne products in the aviation field.

The present disclosure combines multiple technologies such as accelerometer applications, data processing, detection and classification algorithms, and system integration, and continuously monitors the landing status of the aircraft based on comprehensive, complete, and real-time accelerometer data, eliminating uncertain guesses caused by limited fuzzy data. Therefore, the present disclosure can accurately detect the occurrence of high-load landing events, avoid risks caused by missed or false detections, and improve the safety and reliability of aircraft flight. In addition, the present disclosure analyzes and calculates the structural loads of the aircraft, and provides targeted maintenance recommendations for aircraft structural damage that may be caused by high-load landing events, to assist ground maintenance personnel in inspection and maintenance, and to carry out CBM as needed. The present disclosure reduces unnecessary maintenance procedures and manpower investment to enable the aircraft to return to service as soon as possible, thereby lowering the route operation costs of the aircraft.

The present disclosure is described with reference to the flowcharts and/or block diagrams of the method, the device (system), and the computer program product according to the embodiments of the present disclosure. It should be understood that each flow and/or block in the flowchart and/or block diagram and a combination of the flow and/or block in the flowchart and/or block diagram can be implemented by computer program instructions. These computer program instructions may be provided for a general-purpose computer, a dedicated computer, an embedded processor, or a processor of another programmable data processing device to generate a machine, so that the instructions executed by a computer or a processor of another programmable data processing device generate an apparatus for implementing a specific function in one or more processes in the flowcharts and/or in one or more blocks in the block diagrams.

These computer program instructions may also be stored in a computer readable memory that can guide a computer or other programmable data processing devices to work in a specific manner, such that the instructions stored in the computer readable memory produce an article of manufacture including an instruction device, and the instruction device implements the functions specified in one or more flows of the flowchart and/or one or more blocks in the block diagram.

These computer program instructions may alternatively be loaded onto a computer or another programmable data processing device, such that a series of operations and steps are performed on the computer or the another programmable device, thereby generating computer-implemented processing. Therefore, the instructions executed on the computer or another programmable device provide steps for implementing a specific function in one or more processes in the flowcharts and/or in one or more blocks in the block diagrams.

In this specification, specific embodiments are used to describe the principle and implementations of the present disclosure, and the description of the embodiments is only intended to help understand the method and core idea of the present disclosure. Meanwhile, those skilled in the art may, based on the idea of the present disclosure, make modifications with respect to the specific implementations and the application scope. Therefore, the content of this specification shall not be construed as a limitation to the present disclosure.

Those of ordinary skill in the art will understand that the embodiments described herein are intended to help readers understand the principles of the present disclosure, and it should be understood that the protection scope of the present disclosure is not limited to such special statements and embodiments. Those of ordinary skill in the art may make other various specific modifications and combinations according to the technical teachings disclosed in the present disclosure without departing from the essence of the present disclosure, and such modifications and combinations still fall within the protection scope of the present disclosure.

What is claimed is:

1. An aircraft high-load landing event classification method, using an aircraft high-load landing detection method, the aircraft high-load landing event detection method comprising: monitoring, in real time, one or more flight parameters received from an avionics bus; monitoring, in real time, one or more accelerometers installed on an aircraft, and performing sampling at a rate greater than a flight parameter sampling rate, wherein the one or more accelerometers are located at one or more key structural positions of the aircraft; monitoring, in real time, one or more landing data signals comprising at least an acceleration value and a flight parameter, and performing a comparison based on a corresponding preset threshold to determine whether a high-load landing event occurs; storing at least one piece of landing data in response to a detection of at least one storage triggering condition; and ending landing data monitoring and storage in response to a detection of at least one landing completion triggering condition, wherein the aircraft high-load landing event classification method further comprises: extracting, based on one or more of flight parameters stored in a first set, a touchdown event from stored acceleration data, wherein the acceleration data is measured by each accelerometer; comparing one or more accelerometer measured values with a corresponding preset threshold to determine an acceleration exceedance event and a severity thereof in the touchdown event; extracting one or more feature parameters of the touchdown event to form a parameter value table; fusing all stored landing data, and further analyzing and extracting one or more of flight parameters in a second set and/or a feature of a descent rate in the touchdown event to form an extended parameter value table; evaluating the extended parameter value table based on a high-load landing event classification rule, and identifying a type of a high-load landing event through a classification algorithm; and notifying, based on the type and severity of the high-load landing event, maintenance personnel, flight crew, airline management, an aircraft manufacturer, a regulatory agency, or any combination thereof through a relevant mechanism.

2. The aircraft high-load landing event classification method, using the aircraft high-load landing detection method according to claim 1, wherein a condition for triggering real-time monitoring of the flight parameter and the accelerometer comprises a detection of an altitude of the aircraft below a threshold and/or a landing gear extended.

3. The aircraft high-load landing event classification method, using the aircraft high-load landing detection method according to claim 1, wherein the one or more accelerometers are multi-axis accelerometers configured to provide acceleration values in multiple directions.

4. The aircraft high-load landing event classification method, using the aircraft high-load landing detection method according to claim 1, wherein the one or more key structural positions of the aircraft comprise a center of gravity of the aircraft, as well as positions adjacent to connections between a main structure of the aircraft and a front landing gear, a left main landing gear, a right main landing gear, a left wing, a right wing, and a tail.

5. The aircraft high-load landing event classification method, using the aircraft high-load landing detection method according to claim 1, wherein the one or more flight parameters comprise a pitch angle, a roll angle, a radio altitude, a drift angle, a rudder position, a gross weight, a ground speed, a wheel load signal, a landing gear extension/retraction status, a time, a date, or any combination thereof.

6. The aircraft high-load landing event classification method, using the aircraft high-load landing detection method according to claim 1, wherein the detection of the at least one storage triggering condition comprises a detection of a first landing data signal of the aircraft that exceeds a threshold.

7. The aircraft high-load landing event classification method, using the aircraft high-load landing detection method according to claim 1, wherein the landing data comprises a descent rate calculated based on received radio altitude data.

8. The aircraft high-load landing event classification method, using the aircraft high-load landing detection method according to claim 1, wherein the detection of the at least one landing completion triggering condition comprises a detection of a last touchdown event of the aircraft.

9. The aircraft high-load landing event classification method, using the aircraft high-load landing detection method according to claim 8, wherein the touchdown event comprises a touchdown of any one of three landing gears of the aircraft, any one of two wings, any one of two engine nacelles, a tail, or any combination thereof.

10. An aircraft high-load landing event classification method, using the aircraft high-load landing event detection method according to claim 1, and comprising: extracting, based on one or more of flight parameters stored in a first set, a touchdown event from stored acceleration data, wherein the acceleration data is measured by each accelerometer; comparing one or more accelerometer measured values with a corresponding preset threshold to determine an acceleration exceedance event and a severity thereof in the touchdown event; extracting one or more feature parameters of the touchdown event to form a parameter value table; fusing all stored landing data, and further analyzing and extracting one or more of flight parameters in a second set and/or a feature of a descent rate in the touchdown event to form an extended parameter value table; evaluating the extended parameter value table based on a high-load landing event classification rule, and identifying a type of a high-load landing event through a classification algorithm; and notifying, based on the type and severity of the high-load landing event, maintenance personnel, flight crew, airline management, an aircraft manufacturer, a regulatory agency, or any combination thereof through a relevant mechanism.

11. The aircraft high-load landing event classification method according to claim 10, wherein the first set of flight parameters comprises a temporal wheel load signal, a ground speed, a radio altitude, or any combination thereof.

12. The aircraft high-load landing event classification method according to claim 10, wherein exceedance thresholds corresponding to different severities are set for the data measured by accelerometers located at different positions.

13. The aircraft high-load landing event classification method according to claim 10, wherein the one or more feature parameters recorded in the parameter value table comprise a count of all touchdown events, an acceleration exceedance condition of each touchdown event, a maximum acceleration value and an occurrence time and position of the acceleration exceedance event, a time-domain feature of an acceleration change curve, or any combination thereof.

14. The aircraft high-load landing event classification method according to claim 10, wherein all the landing data are fused by: subjecting the recorded sensor data, the flight parameter, and the calculated descent rate to time alignment and sampling rate unification, and merging touchdown events that occur at a same time among touchdown events extracted from the acceleration data.

15. The aircraft high-load landing event classification method according to claim 10, wherein the second set of flight parameters comprises a gross weight, a temporal pitch angle, a roll angle, a descent rate, a drift angle, a rudder position, or any combination thereof.

16. The aircraft high-load landing event classification method according to claim 10, wherein the type of the high-load landing event comprises symmetrical landing, overweight landing, off-center landing, lateral landing, landing with a front landing gear touching down first, three-point landing, tail strike landing, wingtip/nacelle strike landing, high lateral overload landing, or any combination thereof.

17. An aircraft high-load landing event maintenance guidance method, using the aircraft high-load landing event classification method according to claim 10, and comprising: estimating a load condition in one or more key structural areas of an aircraft based on acceleration data collected from at least one accelerometer; comparing a load in each key structural area with a preset threshold to determine a potential damage condition; determining, based on the potential damage condition, whether a maintenance inspection is required for each key structural area, and matching a targeted maintenance recommendation; and integrating high-load landing event information and the maintenance recommendation, generating and storing a report to be viewed or printed by ground maintenance personnel, and sending the report through various communication systems.

18. The aircraft high-load landing event maintenance guidance method according to claim 17, wherein the one or more key structural areas of the aircraft comprise the aircraft's fuselage, front landing gear, left main landing gear, right main landing gear, left wing and left engine, right wing and right engine, tail, or any combination thereof.

19. The aircraft high-load landing event maintenance guidance method according to claim 17, wherein the load condition in the one or more key structural areas of the aircraft is estimated by: calculating a landing load at a node where each accelerometer is located based on the acceleration data collected from the at least one accelerometer, estimating a stress distribution of the landing load in each key structural area, and calculating a stress value in each key structural area.

20. The aircraft high-load landing event maintenance guidance method according to claim 19, wherein the stress distribution of the load, at the node where each accelerometer is located, in each key structural area is estimated by:

searching, in a predefined load distribution table, a measured value close to a calculated load at the node where each accelerometer is located, wherein the load distribution table is provided by the stress distribution, determined by an finite element analysis, of multiple load values at the node where each accelerometer is located.

21. The aircraft high-load landing event maintenance guidance method according to claim 17, wherein the maintenance recommendation comprises maintenance action recommendations formulated for high-load landing events of different types and severities based on an aircraft maintenance manual; and a maintenance action is divided into multiple stages, with a result of a previous stage triggering different action strategies for a subsequent stage.

22. The aircraft high-load landing event maintenance guidance method according to claim 17, wherein the high-load landing event information comprises flight information, high-load landing event types, and key landing data.

23. The aircraft high-load landing event maintenance guidance method according to claim 22, wherein the key landing data comprises a landing weight, maximum vertical and lateral accelerations at a center of gravity, maximum values and positions of all acceleration signals exceeding a threshold, a count of touchdown events, a descent rate and attitude at each touchdown, or any combination thereof.

24. An aircraft high-load landing event classification system, comprising an aircraft high-load landing detection system, the aircraft high-load landing event detection system comprising: one or more accelerometers, located at a selected position on an aircraft, and configured to collect, in real time, acceleration data during an aircraft landing process; a data acquisition unit, configured to collect, at a high sampling rate, the acceleration data transmitted by the accelerometer and perform processing and digitization; an acceleration data processing unit, configured to receive the acceleration data, monitor the acceleration data in real time, process and analyze collected data, and extract a touchdown event and a feature thereof; a storage unit, configured to store landing data; a data processor, located in a central computer of the aircraft or combined with a specialized hardware component, and comprising: a detection module, configured to receive a flight parameter and monitor the flight parameter in real time to assist in determining whether a high-load landing event occurs; a classification module, configured to process, fuse and analyze the stored landing data to determine an occurrence, type, and severity of the high-load landing event; a maintenance recommendation module, configured to calculate and estimate an aircraft landing load and a distribution thereof based on accelerometer data, match a targeted maintenance inspection action recommendation for the high-load landing event, and generate a high-load landing event report; an interface module, configured to receive data from an avionics bus, transmit the high-load landing event report, and send a relevant notification to an interested party; a threshold database, configured to provide a threshold for determining the high-load landing event and a severity thereof; a load distribution table, configured to provide a stress distribution estimate of a load at one or more key nodes of the aircraft in one or more key structural areas; a maintenance action table, configured to provide maintenance action recommendations for different types and severities of high-load landing events; wherein the aircraft high-load landing event classification system is configured to: extract, based on one or more flight parameters stored in a first set, a touchdown event from stored acceleration data, wherein the acceleration data is measured by each accelerometer; compare one or more accelerometer measured values with a corresponding preset threshold to determine an acceleration exceedance event and a severity thereof in the touchdown event;

extract one or more feature parameters of the touchdown event to form a parameter value table; fuse all stored landing data, and further analyze and extract one or more of flight parameters in a second set and/or a feature of a descent rate in the touchdown event to form an extended parameter value table; evaluate the extended parameter value table based on a high-load landing event classification rule, and identify a type of a high-load landing event through a classification algorithm; and notify, based on the type and severity of the high-load landing event, maintenance personnel, flight crew, airline management, an aircraft manufacturer, a regulatory agency, or any combination thereof through a relevant mechanism.

25. The aircraft high-load landing event classification system, comprising the aircraft high-load landing detection system according to claim 24, wherein the storage unit comprises a circular buffer and a non-volatile storage unit that are respectively configured to store landing data before and after a detection of at least one storage triggering condition.

26. The aircraft high-load landing event classification system, comprising the aircraft high-load landing detection system according to claim 24, wherein the acceleration data processing unit and the detection module are configured to detect at least one real-time monitoring triggering condition, at least one storage triggering condition, and at least one landing completion triggering condition based on data from the accelerometer and the flight parameter.

27. The aircraft high-load landing event classification system, comprising the aircraft high-load landing detection system according to claim 24, wherein the classification module comprises a classification rule and classification algorithm based on different levels of thresholds for different landing data.

28. The aircraft high-load landing event classification system, comprising the aircraft high-load landing detection system according to claim 24, wherein the threshold database comprises one or more acceleration thresholds varying with an installation position, one or more flight parameter thresholds, and an allowable stress threshold for one or more key structural areas of the aircraft; and each threshold comprises at least one level of values to reflect different severities.

29. The aircraft high-load landing event classification system, comprising the aircraft high-load landing detection system according to claim 28, wherein the one or more flight parameter thresholds comprise the aircraft's landing weight threshold, descent rate threshold, pitch angle threshold, roll angle threshold, drift angle threshold, rudder position threshold, or any combination thereof.

* * * * *